Patented June 26, 1951

2,558,047

UNITED STATES PATENT OFFICE 2,558,047

CELLULOSE DERIVATIVE PLASTIC COMPOSITION

Walter E. Gloor, New Brunswick, N. J., assignor to Hercules Powder Company, Wilmington, Del., a corporation of Delaware No Drawing. Application April 5, 1947, Serial No. 739,643

9 Claims. (Cl. 106—181)

This invention relates to compositions of matter comprising derivatives of cellulose and methods for their production; more particularly, it relates to plastic compositions comprising a cellulose derivative and a polymerizable plasticizer of the type containing at least two nonconjugated double bonds.

Compounds having at least two nonconjugated double bonds, of which diallyl phthalate is exemplary, have been known to have a high solvent power for cellulose derivatives, and the possibility of their use in the plastics art has been recognized. However, in this application they do not function as do the normal plasticizers for cellulose derivatives inasmuch as the compounds themselves are polymerizable under the influence of heat; and when used in conjunction with linear polymers such as the cellulose derivatives, they are believed to mechanically interlock the cellulosic polymer chains as well as to polymerize themselves. Thus, they are believed to effect what may be described as a vulcanization of the linear cellulosic polymers. Much support for this theory comes from the fact that the resulting plastics are nonthermoplastic or tend in that direction. Although it has been customary in the use of these compounds to employ a catalyst such as benzoyl peroxide, the polymerization and cross-linking proceed without a catalyst only at a slower rate. The plastic products, in addition to tending towards being nonthermoplastic, are characterized by a rather heavy haziness or whiteness and develop undesirable color which points to the incompatibility of the various ingredients after the above-mentioned polymerization and vulcanization reactions have set in.

Now, in accordance with this invention, it has been found that the incorporation during the preparation of plastic masses from cellulose derivatives and such polymerizable or vulcanizing plasticizers of a small amount of an aromatic compound, having at least one OH group or at least one amine group attached directly to the aromatic nucleus, has the effect of inhibiting polymerization and vulcanization and provides cellulose derivative plastics characterized by thermoplasticity, freedom from haze caused by incompatibility, and freedom from objectionable color. In this manner, cellulose derivative plastics may be prepared on the basis of much less plasticizer than that required in the common formulations used heretofore.

The major part of the compositions with which this invention is concerned is either a cellulose ester or ether. The polymerizable plasticizing ingredient employed in conjunction therewith is an organic ester characterized by having at least one ester linkage, said ester containing the polymerizable group $$>C=CH_2$$

and at least one other polymerizable group containing an olefinic double bond separated therefrom by at least one intervening ester linkage so that the double bonds do not form a conjugated system. This plasticizing ingredient must be compatible with the particular cellulose derivative employed, and it must be capable of polymerization per se to a nonthermoplastic compound. The allyl esters of organic polybasic acids are representative of compounds having such characteristics and are particularly preferred in carrying out the processes herein described.

Having described the invention broadly, the following specific examples will serve to point out how the broad principles thereof may be utilized.

The quantities of cellulose acetate, diallyl phthalate, and hydroquinone shown in the table below were mixed together with about 50 parts of ethyl alcohol and about 50 parts of acetone at room temperature. The particular cellulose acetate employed was a plastic type having an acetic acid content of 53.0%. In each instance, when the ingredients had become uniformly dispersed, the mix was transferred to a two-roll mill, heated with water at 150–180° F. circulating through the core, and milled until all but about 20 parts of the solvent were removed and a completely colloided sheet had formed. The sheets were removed at a thickness of about ⅛ in., cooled to room temperature, and granulated on a rotary cutter. The granulations were dried in a tray at 55° C. to a volatile content of less than ½%, and then the resulting molding powder was molded into standard test shapes.

The molding powder was pelleted into ⅜ in. x ⅜ in. diameter cylinders for "Flow Temperature" specimens, and impact bars were made by injecting plastic composition prepared by heating the molding powder to a temperature 100–125° F. higher than the "flow temperature" of the plastic composition, into a ½ in. x ½ in. x 5 in. bar mold. Disks for "hardness" and "water absorption" were molded in a positive-type compression mold, 2 in. in diameter, using a molding temperature of 320° F. and 1500 lbs./sq. in. pressure, and charging enough molding powder to give a disk ¼ in. or ⅛ in. thick, as called for by A. S. T. M. specifications. Test specimens were conditioned as specified by the various test procedures.

Table 1

|  | Examples | | | | |
| --- | --- | --- | --- | --- | --- |
|  | 1 | 2 | 3 | 4 | 5 |
|  |  |  |  | (Comparators) | |
|  | Parts by weight | Parts by weight | Parts by weight | Parts by weight | Parts by weight |
| Cellulose Acetate | 66 | 66 | 66 | 66 | 66 |
| Diallyl Phthalate | 34 | 34 | 34 | 34 | -------- |
| Diethyl Phthalate | -------- | -------- | -------- | -------- | 21 |
| Dimethyl Phthalate | -------- | -------- | -------- | -------- | 13 |
| Hydroquinone | 0.5 | 1.5 | 2.0 | -------- | -------- |
| Benzoyl Peroxide | -------- | -------- | -------- | 0.61 | -------- |
| Properties | | | | | |
| Flow Temperature [1] (°C.) | 153 | 146 | 143 | 147 | 137 |
| Rockwell Hardness [2] | 9M | 2M | 82R | 97M | 15M |
| Charpy Impact [3] (Ft.-lb./in. notch) | 3.1 | 3.4 | 2.5 | 0.30 | 2.8 |
| Plasticizer Loss [4] (Per Cent) | 0.47 | 0.59 | 0.72 | 0.01 | 1.05 |
| Appearance | Clear, Colorless | Same as 1 | Same as 1 | Opaque, Brown | Clear |

[1] A. S. T. M.—D569-43.
[2] A. S. T. M.—D229-42-par. 39—applying major load for ten seconds and minor load for ten seconds before reading.
[3] A. S. T. M.—D256-41T.
[4] A. S. T. M.—D570-42.

The above formulations of Examples 4 and 5 are standard plastic formulations used commercially, Example 5 being a formulation based on the widely used plasticizers, diethyl and dimethyl phthalate, Example 4 being a formulation based on the use of diallyl phthalate in which benzoyl peroxide, a conventional catalyst for such a formulation, is employed. The Example 5 plastic, it will be seen, has a hardness and impact strength such as would be of general utility. The product of Example 4, on the other hand, was not thermoplastic but was characterized by being very hard and of low impact strength, which characteristics are indicative of polymerization and vulcanization by the diallyl phthalate which is used in the formula.

As compared with the plastics of comparator Example 4, the plastics of Examples 1, 2, and 3 were all thermoplastic and were much softer and at the same time tougher, as indicated by their high impact strengths. The plastics of Examples 1, 2, and 3 possessed a high degree of clarity as compared with the very opaque plastic of Example 4. Furthermore, this comparator plastic had a brownish cast as compared with all the other plastics which were colorless.

It was obvious from an inspection of the plastics of Examples 1-3 that the diallyl phthalate plasticizer was completely compatible with the other ingredients, this compatibility being evidenced by the excellent clarity and lack of color of the plastics. It was apparent, on the other hand, that the polymers or vulcanization products resulting from the milling of the ingredients of Example 4 were not entirely compatible with the other ingredients, the plastic of Example 4 having a very opaque, milky appearance in addition to the brown discoloration. When these plastics were subjected to ultraviolet radiation under an S-1 sun lamp for a period of 42 hours (fog box test called for in Navy Specification P41-C), it was found that the Example 4 plastic, which had the benzoyl peroxide catalyst added during its formulation, crazed badly, whereas the other plastics were not affected. These plastics could be given exposures of 100 hours or more without crazing. Outdoor exposure also brought out this differentiating characteristic between the plastics containing hydroquinone in their formulation and the comparator plastic which contained benzoyl peroxide catalyst.

The above examples serve to point out the remarkable difference between cellulose derivative plastics containing diallyl phthalate as a plasticizer when an agent such as hydroquinone is utilized in small quantities in its formulation as compared with other equivalent formulations using a small amount of the usual catalysts.

The following examples show how formulations of plastics containing diallyl phthalate as a plasticizer can be adjusted so as to provide useful thermoplastic products having a practical range of hardness and impact strength if an agent such as hydroquinone is employed in the formulation to inhibit polymerization and vulcanization. The same procedure was used in colloiding the cellulose acetate, making it into a molding powder, and forming plastic disks, as was employed with Examples 1-5, inclusive.

Table 2

|  | Examples | | | | | | |
| --- | --- | --- | --- | --- | --- | --- | --- |
|  | 6 | 7 | 8 | 9 | 10 | 11 | 12 |
| Cellulose Acetate (53.0% acetic acid) | 75 | 80 | 85 | 90 | -------- | -------- | -------- |
| Cellulose Acetate (57.0% acetic acid) | -------- | -------- | -------- | -------- | 72 | 75 | 80 |
| Diallyl Phthalate | 25 | 20 | 15 | 10 | 28 | 25 | 20 |
| Hydroquinone | 2.0 | 2.0 | 2.0 | 2.0 | 0.3 | 2.0 | 2.0 |
| Properties | | | | | | | |
| Flow Temperature (°C.) | 163 | 166 | 165.5 | -------- | 152 | 156 | 172 |
| Rockwell Hardness (M) | 45 | 60 | 76 | 72 | 8 | 29 | 57 |
| Charpy Impact (ft.-lbs./in. notch) | 4.3 | 3.4 | 3.3 | 1.1 | 4.6 | 2.5 | 0.7 |
| Water Absorption [1] (per cent) | 2.72 | 3.07 | 3.55 | 5.36 | 2.97 | 2.72 | 2.12 |
| Plasticizer Loss (per cent) | 0.37 | 0.32 | 0.25 | 0.36 | 0.83 | 0.66 | 0.28 |
| Appearance | Clear, Colorless | Same as 6 | Same as 6 | Same as 6 | Same as 6 | Same as 6 | Same as 6 |

[1] A. S. T. M.—D570-42.

The plastics resulting form the above formulations were all colorless and possessed the clarity characteristic of cellulose acetate colloided with the conventional nonpolymerizing plasticizers. It was also apparent, as shown by the lack of haze and color, that the ingredients of the plastics were compatible with one another. These experiments show that plastics having practical ranges of hardness and impact strength result from the use of 10-25% polymerizing-type plasticizer, substantially less than that heretofore required. More or less plasticizer may be employed, however, for example, between about 5% and about 35% on the basis of the plastic composition.

In comparison with the comparator plastic of Example 4, these plastics have a substantially higher flow temperature and, hence, possess better heat resistance. Another feature of importance in so far as diallyl phthalate is concerned is that its vapor pressure is less than that of methyl or ethyl phthalate used heretofore. These factors, in conjunction with the smaller quantity of plasticizer required, all contribute to promoting dimensional stability in plastics prepared using the subject polymerizable plasticizers. Such plastics generally possess good dimensional stability when subjected to heat or humidity.

The following two examples are given as illustrative of the use of polymerizable plasticizers other than the diallyl phthalate used in the previous examples. The method of colloiding the cellulose acetate and working the colloid up into plastic test pieces was the same as that used in connection with the preceding examples. The resulting plastics were colorless and possessed the clarity characteristic of the plastics of Examples 6-12, inclusive. The particular formulations follow:

|  | Example 13 | Example 14 |
| --- | --- | --- |
| Cellulose Acetate [1] | 66 | 66 |
| Triallyl Citrate | 34 |  |
| Diallyl Adipate |  | 34 |
| Hydroquinone | 2 | 2 |

[1] Acetic acid content 53.0%.

Cellulose derivatives other than cellulose acetate may be employed in carrying out the invention. Thus, for example, cellulose inorganic acid esters, as cellulose nitrate, etc.; cellulose organic esters, as cellulose acetate propionate, cellulose acetate butyrate, cellulose acetate stearate, cellulose acetate caproate, etc.; and cellulose ethers, as ethyl cellulose, benzyl cellulose, etc., may be employed. The particular derivative employed will be one having a degree of esterification or etherification, as the case may be, within the ranges normally used for the preparation of plastic products. Thus, cellulose acetate, to which this invention has particular application, will, if employed, have an acetic acid content between about 51.0% and 59.0%, preferably between about 52.0% and 58.0%. It is, furthermore, preferred that the cellulose acetate employed have a chain length corresponding to an intrinsic viscosity of 1.0 or higher, as determined by the method of Kraemer, see "Journal of Industrial and Engineering Chemists," 30, 1200 (1938).

The examples have shown the use of diallyl phthalate, triallyl citrate, and diallyl adipate as polymerizable plasticizers. However, these are merely representative of a class of compounds which may be used for the same purpose. Thus, any organic ester characterized by having at least one ester linkage, said ester containing the polymerizable group $$>C=CH_2$$

and at least one other polymerizable group containing an olefinic double bond separated therefrom by at least one intervening ester linkage so that the double bonds do not form a conjugated system, may be employed. For example, vinyl or allyl esters of polybasic acids, such as succinic, adipic, phthalic, citric, tartaric, sebacic, etc.; acrylic and alpha-substituted acrylic esters of polyhydric alcohols, such as glycol, glycerol, diethylene glycol, trimethylene glycol, etc.; vinyl or allyl esters of acrylic or crotonic acids, etc., may be employed. Of these various compounds, the allyl esters of polybasic organic acids are preferred, particularly the esters of phthalic, adipic, and citric acids. If desired, any of the conventionally employed plasticizers for the particular cellulose derivative being used may be employed in conjunction with the above polymerizable plasticizers in the compositions of this invention, provided they are sufficiently compatible with the other ingredients. In order to achieve the benefits of the use of the polymerizable-type plasticizer, however, the total plasticizer content of the composition should consist of at least 50% by weight of polymerizable-type plasticizer.

As the agent which has been found useful in impeding the polymerization or vulcanizing action of the plasticizers used in accordance with this invention, it has been found that any aromatic compound having at least one hydroxyl group or at least one amine group attached directly to the aromatic nucleus may be employed. Thus, for example, phenols, as phenol, hydroquinone, p-phenyl phenol, catechol, p-menthyl phenol, p-hydroxy phenyl stearate, hydroquinone monobenzyl ether, benzyl catchol, etc.; primary amines, as alpha-naphthylamine, phenyl beta-naphthylamine, etc.; secondary amines, as diphenyl amine, diphenyl hydrazine, diphenyl guanidine, symmetrical dibeta-naphthyl-p-phenylenediamine, etc.; amino-substituted phenols, as p-amino phenol, tyrosine ethyl ester, etc., may be employed. Of these various compounds, aromatic compounds having not more than 13 carbon atoms have given the best results, with hydroquinone being particularly preferred.

In regard to the amount of such agent to employ in any particular case, it is obvious that varying amounts can be employed to achieve different effects. Thus, it may not be desired to stop the polymerizing or vulcanizing action of the plasticizer entirely, in which event a comparatively small amount of the agent will be employed. In general, between about 0.1% and about 5.0% of the agent on the basis of the total of the non-volatile ingredients will be employed, the preferred amount being between about 0.3% and about 3.0% of the nonvolatile ingredients. Of the broad general class of agents which have been found effective in impeding the polymerizing and vulcanizing reactions of the polymerizable plasticizers employed in the compositions of this invention, the agent employed in any particular case may be such as to be soluble in the plastic mass or it may be present in the plastic mass in finely-divided form uniformly dispersed throughout the plastic mass. It is furthermore preferred that the agent be introduced prior to commencement of the colloiding of the particular cellulose derivative employed; i. e., mixed with the cellulose derivative, polymerizable plasticizer, etc., before the mass is milled on a hot roll mill, mixed in a high-pressure mixer of the Banbury type, etc.

In carrying out the preceding examples, the colloiding of the cellulose derivative was effected by the "solvent" process in which a volatile solvent for the cellulose derivative and plasticizer is mixed therewith to form a paste and the paste then milled on a hot roll mill to remove most of the volatile solvent and form a homogeneous colloided mass of the cellulose derivative and plasticizer. The invention with which this application is concerned, however, is not limited to carrying out the colloiding and subsequent operations of shaping, granulation to form molding powder, etc., in any particular manner. Any of the processes known to the art may be employed. Thus, colloiding may be effected by high-pressure mixing (without the use of volatile solvent), as in a Banbury mixer, by the use of an aqueous slurry of the cellulose derivative to which the plasticizer is added with agitation, and by other common means.

In preparing plastic compositions in accordance with the method of this invention, the amount of cellulose derivative or the proportion of cellulose derivative to polymerizable plasticizer employed may be varied considerably depending on the mechanical properties desired in the finished plastics. Furthermore, ingredients in addition to the essential ones may be employed, as, for example, resins, gums, fillers, dyes, pigments, etc. The methods of incorporation of these ingredients and the adjustment of formulations to achieve desired properties of the finished products are known to the art. It is very significant, however, that by employing the subject polymerizable plasticizers in conjunction with one of the agents which have been found to effectively impede polymerization and vulcanization reactions, it is now possible to make cellulose derivative plastics having a practical range of hardness and impact strength using substantially less plasticizer than has been required heretofore on the basis of the best prior art plasticizers. Thus, in a plastic formulated from cellulose acetate using diallyl phthalate as the plasticizer, practical plastics may be made using 10 to 25% plasticizer based on the finished plastic.

The products prepared in accordance with this invention possess a clarity and freedom from color which has not been obtainable heretofore in compositions containing the subject polymerizable plasticizers. Hence, it is now possible to take practical advantage of the desirable characteristics of these plasticizers. The use of an agent, such as hydroquinone, to impede the normal polymerizing and vulcanizing reactions of these plasticizers in plastic formulations which contain linear polymers, leads to the formation of truly thermoplastic products possessing desirable impact strength and hardness. Plastics prepared utilizing the principles of this invention are characterized by excellent compatibility of the ingredients. Further evidence of their utility lies in the fact that they do not craze upon short exposure to concentrated ultraviolet light or upon normal atmospheric exposure, as do plastics prepared from the subject polymerizable plasticizers without the use of an agent, such as hydroquinone, to impede the polymerizing and vulcanizing reactions. The subject plastics are further characterized by better dimensional stability than the prior art plastics based on conventional plasticizers.

It will be understood that all parts and percentages herein are by weight unless otherwise mentioned.

What I claim and desire to protect by Letters Patent is:

1. A thermoplastic molding powder comprising a major proportion of a thermoplastic cellulose ester and a minor proportion of a plasticizer therefore, said plasticizer comprising at least 50% by weight of a compound compatible therewith and capable of polymerization per se to a nonthermoplastic material, said compound being an organic ester having at least one ester linkage, said ester containing the polymerizable group $>CH=CH_2$ and at least one other polymerizable group containing an olefinic double bond separated therefrom by at least one intervening ester linkage so that the double bonds do not form a conjugated system, said molding powder being free of polymerization catalyst and essentially containing about 0.1% to about 5% of an inhibitor of the group consisting of phenols, aromatic primary amines, aromatic secondary amines, and amino-substituted phenols based on the weight of said molding powder to maintain thermoplasticity at molding temperatures.

2. A thermoplastic molding powder comprising a major proportion of a thermoplastic cellulose ester and a minor proportion of a plasticizer therefore, said plasticizer comprising at least 50% by weight of an allyl ester of an organic polycarboxylic acid, said molding powder being free of polymerization catalyst and essentially containing about 0.1% to about 5% of an inhibitor of the group consisting of phenols, aromatic primary amines, aromatic secondary amines, and amino-substituted phenols based on the weight of said molding powder to maintain thermoplasticity at molding temperatures.

3. A thermoplastic molding powder comprising a major proportion of a thermoplastic cellulose acetate and a minor proportion of a plasticizer therefor, said plasticizer comprising at least 50% by weight of a compound compatible therewith and capable of polymerization per se to a nonthermoplastic material, said compound being an organic ester having at least one ester linkage, said ester containing the polymerizable group $>C=CH_2$ and at least one other polymerizable group containing an olefinic double bond separated therefrom by at least one intervening ester linkage so that the double bonds do not form a conjugated system, said molding powder being free of polymerization catalyst and essentially containing about 0.1% to about 5% of an inhibitor of the group consisting of phenols, aromatic primary amines, aromatic secondary amines, and amino-substituted phenols based on the weight of said molding powder to maintain thermoplasticity at molding temperatures.

4. A thermoplastic molding powder comprising a major proportion of a thermoplastic cellulose ester and a minor proportion of a plasticizer therefor, said plasticizer comprising at least 50% by weight of diallyl phthalate, said molding powder being free of polymerization catalyst and essentially containing about 0.1% to about 5% of an inhibitor of the group consisting of phenols, aromatic primary amines, aromatic secondary amines, and amino-substituted phenols based on the weight of said molding powder to maintain thermoplasticity at molding temperatures.

5. A thermoplastic molding powder comprising a major proportion of a thermoplastic cellulose ester and a minor proportion of a plasticizer therefor, said plasticizer comprising at least 50% by weight of triallyl citrate, said molding powder being free of polymerization catalyst and essentially containing about 0.1% to about 5% of an inhibitor of the group consisting of phenols, aromatic primary amines, aromatic secondary amines, and amino-substituted phenols based on the weight of said molding powder to maintain thermoplasticity at molding temperatures.

6. A thermoplastic molding powder comprising a major proportion of a thermoplastic cellulose ester and a minor proportion of a plasticizer therefor, said plasticizer comprising at least 50% by weight of diallyl adipate, said molding powder being free of polymerization catalyst and essentially containing about 0.1% to about 5% of an inhibitor of the group consisting of phenols, aromatic primary amines, aromatic secondary amines, and amino-substituted phenols based on the weight of said molding powder to maintain thermoplasticity at molding temperatures.

7. A thermoplastic molding powder comprising a major proportion of a thermoplastic cellulose acetate and a minor proportion of a plasticizer therefor, said plasticizer comprising at least 50% by weight of diallyl phthalate, said molding powder being free of polymerization catalyst and essentially containing about 0.1% to about 5% of hydroquinone based on the weight of said molding powder to maintain thermoplasticity at molding temperatures.

8. A thermoplastic molding powder comprising a major proportion of a thermoplastic cellulose acetate and a minor proportion of a plasticizer therefor, said plasticizer comprising at least 50% by weight of triallyl citrate, said molding powder being free of polymerization catalyst and essentially containing about 0.1% to about 5% of hydroquinone based on the weight of said molding powder to maintain thermoplasticity at molding temperatures.

9. A thermoplastic molding powder comprising a major proportion of a thermoplastic cellulose acetate and a minor proportion of a plasticizer therefor, said plasticizer comprising at least 50% by weight of diallyl adipate, said molding powder being free of polymerization catalyst and essentially containing about 0.1% to about 5% of hydroquinone based on the weight of said molding powder to maintain thermoplasticity at molding temperatures.

WALTER E. GLOOR.

REFERENCES CITED

The following references are of record in the file of this patent:

UNITED STATES PATENTS

| Number | Name | Date |
| --- | --- | --- |
| 2,005,414 | Dykstra | June 18, 1935 |
| 2,104,760 | Renfrew | Jan. 11, 1938 |
| 2,155,590 | Garvey | Apr. 25, 1939 |
| 2,249,768 | Kropa | July 22, 1941 |
| 2,336,985 | Freund | Dec. 14, 1943 |
| 2,374,081 | Dean | Apr. 17, 1945 |
| 2,379,346 | Muskat | June 26, 1945 |
| 2,420,720 | Pechukas et al. | May 20, 1947 |
| 2,425,351 | Sharphouse et al. | Aug. 12, 1947 |
| 2,443,736 | Kropa | June 22, 1948 |

FOREIGN PATENTS

| Number | Country | Date |
| --- | --- | --- |
| 540,167 | Great Britain | Oct. 8, 1941 |
| 540,169 | Great Britain | Oct. 8, 1941 |

Certificate of Correction

Patent No. 2,558,047 June 26, 1951

WALTER E. GLOOR

It is hereby certified that error appears in the printed specification of the above numbered patent requiring correction as follows:

Column 6, line 42, for "catchol" read *catechol*; column 8, line 18, for ">CH=CH$_2$," read >$C$=$CH_2$;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*